United States Patent Office 3,490,921
Patented Jan. 20, 1970

3,490,921
COOKED SWEET CORN FLAVORING COMPOSITION FOR VEGETABLE OILS
Daniel Melnick, West Englewood, N.J., and Helen L. Zmachinski, Bronx, N.Y., assignors to Corn Products Company, New York, N.Y., a corporation of Delaware
No Drawing. Filed Aug. 25, 1966, Ser. No. 574,930
Int. Cl. A23l 1/26, 5/00
U.S. Cl. 99—140                                    7 Claims

ABSTRACT OF THE DISCLOSURE

A flavoring composition which, when added to a liquid vegetable oil imparts to said oil the flavor of freshly cooked sweet corn, comprises a combination of from about 1.0 to about 4.0 parts by weight of ethyl vanillin and 1 part by weight ethyl n-butyrate. The flavoring composition should be added to the vegetable oil in an amount of from about 30 parts per billion to about 400 parts per billion. In addition, if it is desired to add a buttery flavor to the flavored oil, diacetyl, in an amount of at least 90 parts per billion, may be added.

---

This invention relates to a process for imparting to refined edible liquid vegetable oils the flavor of freshly cooked sweet corn, and to the vegetable oils prepared in accordance with the process.

Most refined liquid vegetable oils which are prepared for use by home makers as frying oils or for use on salads, vegetables and the like are substantially devoid of any actual flavor, or taste. However, because of their oily consistency, when taken into the mouth they impart an oily sensation which is frequently translated as an "oily flavor."

It would be desirable to improve the flavor characteristics of liquid vegetable oils; one would not, however, want to add a flavoring material which would in turn be imparted to foodstuffs cooked in the oil. Furthermore, one would not wish to add a flavor which would be incompatible with, and unexpected in, a vegetable oil; vegetable oil with, say, a strawberry taste would be so incongruous as to be highly disturbing to most persons.

Corn oil is, of course, one of the most popular and best known liquid vegetable oils on the market. To many people, the word "corn" calls to mind the delicious flavor of freshly cooked sweet corn, preferably "on-the-cob" and lavishly spread with butter.

We have discovered a flavoring composition which, when added to an otherwise tasteless refined vegetable oil, will impart to the oil a taste identical with that of unbuttered, freshly cooked sweet corn. As a modification of our invention, and a preferred embodiment thereof, we have discovered a flavoring composition which will impart to such oils a taste identical with buttered freshly cooked sweet corn.

Although our invention is particularly suitable for use in corn oil, because a sweet corn flavor would most naturally be associated with oil derived from corn, it is also applicable for use in any substantially tasteless refined liquid vegetable oil, e.g. cottonseed oil, soybean oil, or the like.

Our basic flavoring composition comprises a blend of ethyl vanillin and ethyl n-butyrate, in the ratio of from about 1.0 to about 4.0 parts of ethyl vanillin to 1 part of ethyl n-butyrate (parts by weight). Addition of this composition to a refined vegetable oil results in a vegetable oil with a taste identical to unbuttered freshly cooked sweet corn.

Both ethyl vanillin and ethyl n-butyrate have been previously used in margarines to impart a butter flavor to the margarine; it is totally unexpected, therefore, that these ingredients in combination and in the specific ratio set forth would impart to a tasteless vegetable oil the flavor of unbuttered sweet corn.

It is common practice, of course, to add butter to cooked sweet corn. A modification of our invention is the developement of a flavoring composition which will impart to vegetable oils the taste of buttered sweet corn; we have discovered that the addition of diacetyl to our basic flavoring composition accomplishes this result. It should be noted that the three-component blend of ethyl vanillin, ethyl n-butyrate and diacetyl does not give merely a butter flavor to the vegetable oil, but rather a true flavor of freshly cooked sweet corn with butter added.

It should be stressed that the ratio of from about 1.0 to about 4.0 parts ethyl vanillin to 1 part ethyl n-butyrate is critical; ratios outside this range do not result in the desired flavor. We prefer a ratio of about 2/1 but, because likes and dislikes with respect to food flavors are largely a matter of individual personal preference, it is difficult to define an optimum ratio with precision.

The basic flavoring composition should be added to the vegetable oil in an amount of from about 30 parts per billion to about 400 parts per billion (parts by weight). The optimum amount is, of course, largely a matter of individual personal preference, but we have found that about 60 parts per billion ethyl vanillin and 30 parts per billion ethyl n-butyrate gave an excellent flavor which was preferred by many persons.

If it is desired to use diacetyl in addition to the basic flavoring composition, at least about 90 parts per billion should be added to the vegetable oil in order to obtain a detectable butter flavor. There is no critical upper limit to the amount of diacetyl which can be added; as the amount is increased, the butter flavor becomes stronger. About 150 parts per billon gave a butter flavor which was rated "excellent" by a number of persons; however, because some persons apply butter sparingly to sweet corn while others spread it on with a heavy hand it is impossible to set a precise optimum amount of the diacetyl.

It should be noted that addition of our flavoring compositions to vegetable oils in no way changes the odor of the initial oils; furthermore, when used for cooking (e.g. frying) the flavored oils neither give off any characteristic odor nor do they impart any flavor to the foodstuffs. Except for the delightful flavor of the oils themselves, they are indistinguishable from conventional refined vegetable oils.

Preparation of vegetable oils in accordance with our invention is extremely simple; because all of the ingredients of the flavoring compositions are soluble in vegetable oils, preparation simply involves adding the ingredients, in the proper proportions and amounts, to the vegetable oils.

The following examples will illustrate the invention. They are presented for illustrative purposes only and should not be considered to be limiting in any way.

EXAMPLE I

Three stock solutions, each containing 100 parts per million of one of the ingredients (ethyl vanillin, ethyl n-butyrate and diacetyl) were prepared by adding to 1.0 kilogram of refined corn oil 0.10 gram of the ingredient. The stock solutions were gently agitated, allowed to stand overnight (approximately 16 hours), and again gently agitated in order to insure complete solution of the added ingredient.

Then 0.60 gm. of the ethyl vanillin solution, 0.30 gm. of the ethyl n-butyrate solution and 1.50 gm. of the diacetyl solution were added to 1.0 kg. of refined corn oil. The oil containing the added ingredients was mixed well by gently stirring.

The resultant product had an excellent flavor, very similar to that of buttered freshly cooked sweet corn.

EXAMPLE II

The procedure of Example I was repeated, except the diacetyl was omitted. The resultant product had a very pleasant flavor, similar to that of unbuttered freshly cooked sweet corn.

EXAMPLE III

Stock solutions of ethyl vanillin and ethyl n-butyrate were prepared as in Example I, after which 0.70 gm. of the ethyl vanillin solution and 0.50 gm. of the ethyl n-butyrate solution were added to 1.0 kg. of refined corn oil.

The resultant product had excellent flavor, very similar to, but slightly more pronounced than, that of Example II.

EXAMPLE IV

Example III was repeated, except 0.45 gm. of the ethyl vanillin solution and 0.15 gm. of the ethyl n-butyrate were used. The product had a very pleasant mild flavor of unbuttered freshly cooked sweet corn.

EXAMPLE V

In accordance with the procedure of the previous examples, stock solutions of ethyl vanillin and ethyl n-butyrate in refined cottonseed oil were prepared. 0.30 gm. of the ethyl vanillin solution and .20 gm. of the ethyl n-butyrate solution were blended in 1.0 kg. of refined cottonseed oil. The product had a mild, pleasant sweet corn flavor.

EXAMPLE VI

Stock solutions of ethyl vanillin and ethyl n-butyrate in refined soybean oil were prepared; 0.30 gm. of the ethyl vanillin solution and 0.15 gm. of the ethyl n-butyrate solution were added to 1.0 kg. of refined soybean oil. The product had a flavor similar to that of Example V.

EXAMPLE VII

Example I was repeated except only 0.30 gm., instead of 1.50 gm., of the diacetyl solution was used. No butter flavor was detectable; the product had a taste similar to that of Example II. When the amount of diacetyl was increased to about 90 parts per billion a mild butter flavor resulted. As the amount of diacetyl was increased, the butter flavor became correspondingly stronger.

We claim:
1. As a new composition of matter, a refined edible liquid vegetable oil in admixture with from about 30 parts per billion to about 400 parts per billion of a flavoring composition, said flavoring composition consisting essentially of ethyl vanillin and ethyl n-butyrate in combination, the ingredients being present in the ratio of from about 1.0 to about 4.0 parts by weight of ethyl vanillin to 1 part by weight of ethyl n-butyrate, said flavoring composition imparting to said vegetable oil the flavor of freshly cooked sweet corn.

2. A composition in accordance with claim 1, wherein the ingredients of the flavoring composition are present in the ratio of about two parts by weight of ethyl vanillin to one part by weight of ethyl n-butyrate.

3. As a new composition of matter, a refined edible liquid vegetable oil in admixture with from about 30 parts per billion to about 400 parts per billion of a flavoring composition, said flavoring composition consisting essentially of ethyl vanillin and ethyl n-butyrate in combination, the ingredients being present in the ratio of from about 1.0 to about 4.0 parts by weight of ethyl vanillin to 1 part by weight of ethyl n-butyrate, and in addition at least 90 parts per billion of diacetyl, said flavoring composition plus said diacetyl imparting to said vegetable oil the flavor of buttered, freshly cooked sweet corn.

4. A composition in accordance with claim 3, wherein the ingredients of the flavoring composition are present in the ratio of about two parts by weight of ethyl vanillin to one part by weight of ethyl n-butyrate.

5. The composition of claim 4 wherein the diacetyl is present in the amount of about 150 parts per billion.

6. As a new composition of matter, refined corn oil in admixture with about 60 parts per billion of ethyl vanillin and about 30 parts per billion ethyl n-butyrate, said ethyl vanillin and ethyl n-butyrate imparting to said corn oil the flavor of freshly cooked sweet corn.

7. As a new composition of matter, refined corn oil in admixture with about 60 parts per billion ethyl vanillin, about 30 parts per billion ethyl n-butyrate and about 150 parts per billion diacetyl, said ethyl vanillin, ethyl n-butyrate and diacetyl imparting to said corn oil the flavor of buttered, freshly cooked sweet corn.

References Cited

UNITED STATES PATENTS

| | | | |
|---|---|---|---|
| 2,773,772 | 12/1956 | Merker | 99—123 |
| 2,903,364 | 9/1959 | Wode et al. | 99—140 |
| 3,106,472 | 10/1963 | O'Brian et al. | 99—118 |

OTHER REFERENCES

Andersen et al.: Margarine, Pergamon Press, New York, 1965, pp. 40, 41, 128, 129 and 130.

Jacobs: Synthetic Food Adjuncts, O. Van Nostrand Company, Inc., 1947, pp. 176, 178.

Merory: Food Flavorings, Avi Publishing Co., Westport, Conn., 1960, pp. 166, 167.

MAURICE W. GREENSTEIN, Primary Examiner

H. H. KLARE III, Assistant Examiner

U.S. Cl. X.R.

99—123